US010995635B2

(12) United States Patent
Lamson

(10) Patent No.: US 10,995,635 B2
(45) Date of Patent: May 4, 2021

(54) APPARATUS AND METHOD FOR MITIGATING PARTICULATE ACCUMULATION ON A COMPONENT OF A GAS TURBINE ENGINE

(71) Applicant: United Technologies Corporation, Farmington, CT (US)

(72) Inventor: Scott H. Lamson, Menands, NY (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 588 days.

(21) Appl. No.: 15/827,630

(22) Filed: Nov. 30, 2017

(65) Prior Publication Data

US 2019/0162080 A1    May 30, 2019

(51) Int. Cl.
*F01D 25/32* (2006.01)
*F01D 25/12* (2006.01)
(Continued)

(52) U.S. Cl.
CPC ............ *F01D 25/32* (2013.01); *F01D 25/12* (2013.01); *F23R 3/002* (2013.01); *F23R 3/005* (2013.01); *F23R 3/06* (2013.01); *F05D 2220/32* (2013.01); *F05D 2240/15* (2013.01); *F05D 2240/35* (2013.01); *F05D 2250/232* (2013.01); *F05D 2260/201* (2013.01); *F05D 2260/202* (2013.01); *F05D 2260/607* (2013.01);
(Continued)

(58) Field of Classification Search
CPC .. F23R 3/002; F23R 3/005; F23R 3/04; F23R 3/06; F23R 3/16; F23R 3/50; F01D 25/12; F01D 25/14; F01D 25/08; F02C 7/05; F02C 7/052; B64D 2033/022
See application file for complete search history.

(56) References Cited

U.S. PATENT DOCUMENTS 4,875,339 A * 10/1989 Rasmussen ............... F23R 3/06
60/757
4,896,510 A    1/1990 Foltz
(Continued)

FOREIGN PATENT DOCUMENTS

EP      2141329 A2    1/2010
WO   2014149119 A2    9/2014

OTHER PUBLICATIONS

European Search Report for Application No. 18209575.2; dated Apr. 17, 2019, 9 pages.

*Primary Examiner* — Craig Kim
(74) *Attorney, Agent, or Firm* — Cantor Colburn LLP

(57) ABSTRACT

A gas turbine engine component assembly is provided. The gas turbine engine comprises: a first component having a first surface and a second surface opposite the first surface; a second component having a first surface and a second surface, the first surface of the first component and the second surface of the second component defining cooling channel therebetween in fluid communication with the cooling hole for cooling the second surface of the second component; and a particulate mitigation device extending from the first surface of the second component a selected distance wherein the particulate mitigation device has an opening therethrough in fluid connection with the cooling channel, and wherein the selected distance is selected to reduce the amount of particulate entering the cooling channel.

7 Claims, 4 Drawing Sheets

(51) Int. Cl.
*F23R 3/00* (2006.01)
*F23R 3/06* (2006.01)

(52) U.S. Cl.
CPC ............... *F23R 2900/00004* (2013.01); *F23R 2900/03041* (2013.01); *F23R 2900/03044* (2013.01)

(56) References Cited

U.S. PATENT DOCUMENTS

| | | | |
|---|---|---|---|
| 8,161,752 B2 * | 4/2012 | Yankowich | F23R 3/005 |
| | | | 60/752 |
| 2010/0251723 A1 * | 10/2010 | Chen | F02C 7/18 |
| | | | 60/760 |
| 2012/0047908 A1 | 3/2012 | Poyyapakkam et al. | |
| 2012/0297778 A1 * | 11/2012 | Rudrapatna | F23R 3/045 |
| | | | 60/755 |
| 2013/0081401 A1 * | 4/2013 | Kim | F23R 3/50 |
| | | | 60/772 |
| 2016/0377289 A1 * | 12/2016 | Kostka, Jr. | F23R 3/06 |
| | | | 60/752 |
| 2017/0191417 A1 | 7/2017 | Bumker et al. | |

* cited by examiner

APPARATUS AND METHOD FOR MITIGATING PARTICULATE ACCUMULATION ON A COMPONENT OF A GAS TURBINE ENGINE

BACKGROUND

The subject matter disclosed herein generally relates to gas turbine engines and, more particularly, to method and apparatus for mitigating particulate accumulation on cooling surfaces of components of gas turbine engines.

In one example, a combustor of a gas turbine engine may be configured and required to burn fuel in a minimum volume. Such configurations may place substantial heat load on the structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shield and reduce durability. Particulates, in particular atmospheric particulates, include solid or liquid matter suspended in the atmosphere such as dust, ice, ash, sand and dirt.

SUMMARY

According to one embodiment, a gas turbine engine component assembly is provided. The gas turbine engine comprises: a first component having a first surface and a second surface opposite the first surface; a second component having a first surface and a second surface, the first surface of the first component and the second surface of the second component defining cooling channel therebetween in fluid communication with the cooling hole for cooling the second surface of the second component; and a particulate mitigation device extending from the first surface of the second component a selected distance wherein the particulate mitigation device has an opening therethrough in fluid connection with the cooling channel, and wherein the selected distance is selected to reduce the amount of particulate entering the cooling channel.

In addition to one or more of the features described above, or as an alternative, further embodiments may include that the particulate mitigation device further comprises a tubular body fluidly connecting the opening to the cooling channel.

In addition to one or more of the features described above, or as an alternative, further embodiments may include a cooling hole extending from the second surface of the first component to the first surface of the first component surface through the first component, wherein the tubular body is fluidly connected to the cooling channel through the cooling hole.

In addition to one or more of the features described above, or as an alternative, further embodiments may include a cooling hole extending from the second surface of the first component to the first surface of the first component surface through the first component, wherein the tubular body is located within the cooling hole.

In addition to one or more of the features described above, or as an alternative, further embodiments may include that the tubular body further comprises a first end and a second end opposite the first end, wherein the first end includes the opening.

In addition to one or more of the features described above, or as an alternative, further embodiments may include that the second end is located in the cooling channel at a second selected distance away from the first surface of the first component.

In addition to one or more of the features described above, or as an alternative, further embodiments may include that a particulate mitigation device further comprises a fairing including a fluid passageway fluidly connecting the opening to the cooling channel.

In addition to one or more of the features described above, or as an alternative, further embodiments may include that the fairing has a conical frustum shape.

In addition to one or more of the features described above, or as an alternative, further embodiments may include that the fairing further comprises: a first face flush with the second surface of the first component; a second face opposite the first face, wherein a first surface area of the first face is greater than a second surface area of the second face; and a ramp surface interposed between the first face and the second face, wherein the fluid passageway extends from the first face to the second face.

In addition to one or more of the features described above, or as an alternative, further embodiments may include that the panel includes a cooling hole extending from the second surface of the second component to the first surface of the second component through the second component.

According to another embodiment, a shell of a combustor for a gas turbine engine is provided. The shell comprising: a combustion chamber of the combustor, the combustion chamber having combustion area; a combustion liner having an inner surface and an outer surface opposite the inner surface; a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the combustion liner by an impingement cavity; and a particulate mitigation device attached to the combustion liner, the particulate mitigation device extending from the outer surface of the combustion liner into a flow path, the particulate mitigation devices having an opening at a first selected distance away from the outer surface, the opening being fluidly connected with the impingement cavity, and wherein the first selected distance is greater than or equal to a boundary layer of the second surface.

In addition to one or more of the features described above, or as an alternative, further embodiments may include that the particulate mitigation device further comprises a tubular body fluidly connecting the opening to the impingement cavity.

In addition to one or more of the features described above, or as an alternative, further embodiments may include a primary aperture extending from the outer surface to the inner surface through the liner, wherein the tubular body is fluidly connected to the impingement cavity through the primary aperture.

In addition to one or more of the features described above, or as an alternative, further embodiments may include a primary aperture extending from the outer surface to the inner surface through the liner, wherein the tubular body is located within the primary aperture.

In addition to one or more of the features described above, or as an alternative, further embodiments may include that the tubular body further comprises a first end and a second end opposite the first end, wherein the first end includes the opening.

In addition to one or more of the features described above, or as an alternative, further embodiments may include that the second end is located in the impingement cavity at a second selected distance away from the inner surface.

In addition to one or more of the features described above, or as an alternative, further embodiments may include that a particulate mitigation device further comprises a fairing including a fluid passageway fluidly connecting the opening to the impingement cavity.

In addition to one or more of the features described above, or as an alternative, further embodiments may include that the fairing has a conical frustum shape.

In addition to one or more of the features described above, or as an alternative, further embodiments may include that the fairing further comprises: a first face flush with the outer surface; a second face opposite the first face, wherein a first surface area of the first face is greater than a second surface area of the second face; and a ramp surface interposed between the first face and the second face, wherein the fluid passageway extends from the first face to the second face.

In addition to one or more of the features described above, or as an alternative, further embodiments may include that the heat shield panel includes a secondary aperture extending from the second surface to the first surface through the heat shield panel.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of panels of the combustor wall may be used to help cool the combustor. Convective cooling may be achieved by air that is channeled between the panels and a liner of the combustor. Impingement cooling may be a process of directing relatively cool air from a location exterior to the combustor toward a back or underside of the panels.

Thus, combustion liners and heat shield panels are utilized to face the hot products of combustion within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor. The cooling air may contain particulates, which may build up on the heat shield panels overtime, thus reducing the cooling ability of the cooling air. Embodiments disclosed herein seek to address particulate adherence to the heat shield panels in order to maintain the cooling ability of the cooling air.

Figure 1:
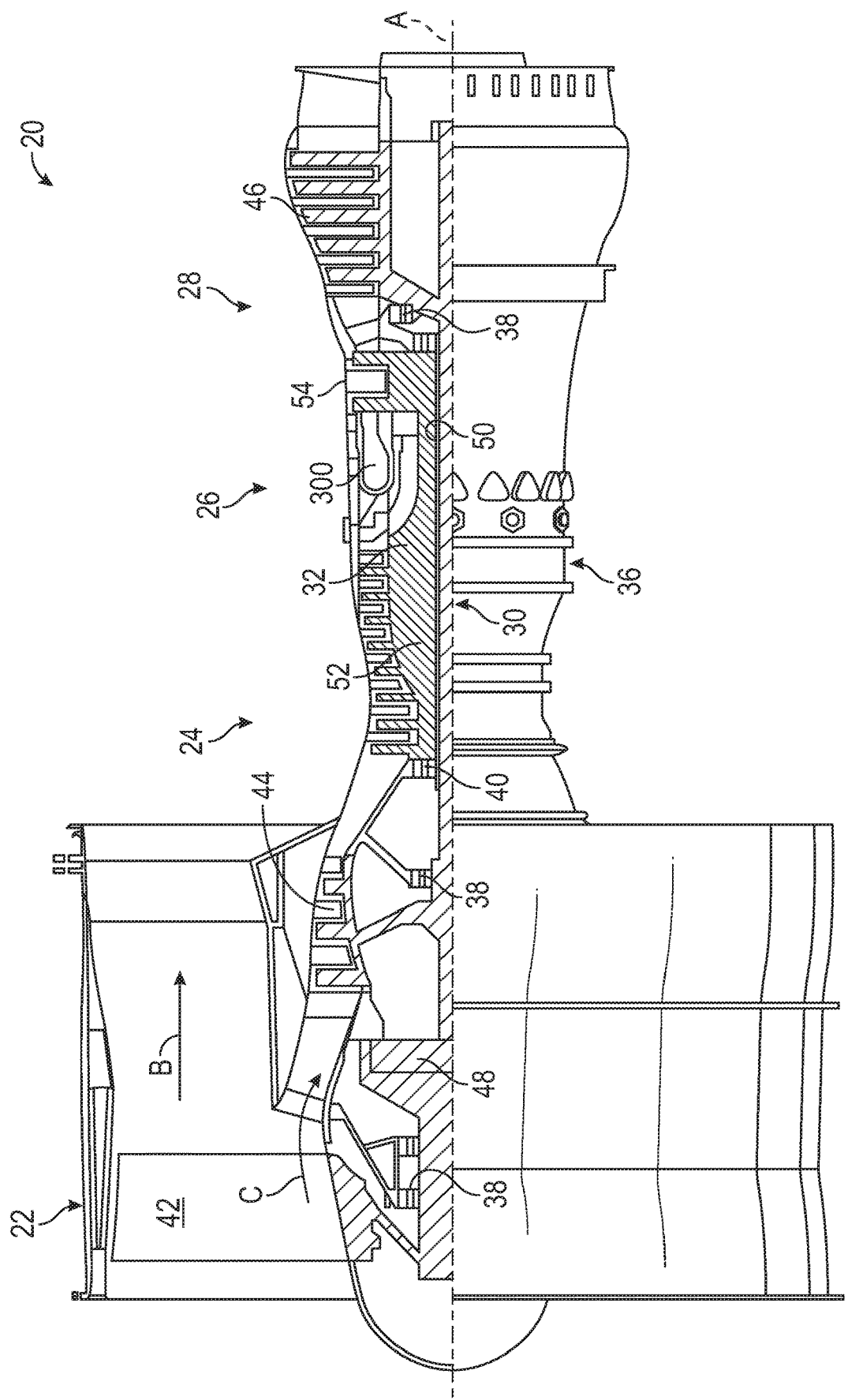
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
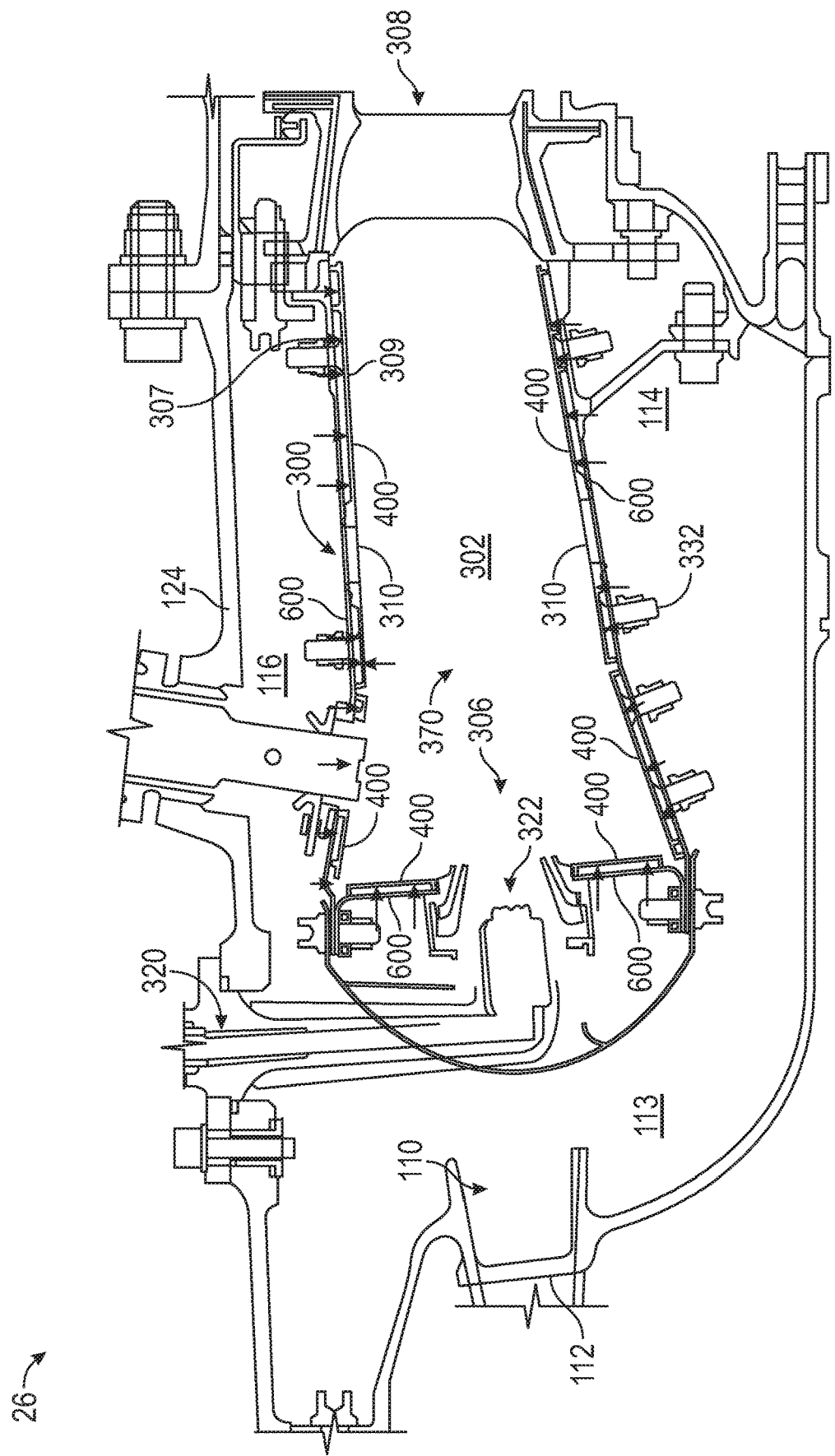
FIG. 2 is a cross-sectional illustration of a combustor, in accordance with an embodiment of the disclosure.

Referring now to FIG. 2 and with continued reference to FIG. 1, the combustor section 26 of the gas turbine engine 20 is shown. As illustrated in FIG. 2, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

As shown in FIG. 2, compressor air is supplied from a compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more primary apertures 307 in the combustion liner 600 and one or more secondary apertures 309 in the heat shield panels 400. The primary apertures 307 and secondary apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

Figure 3A:
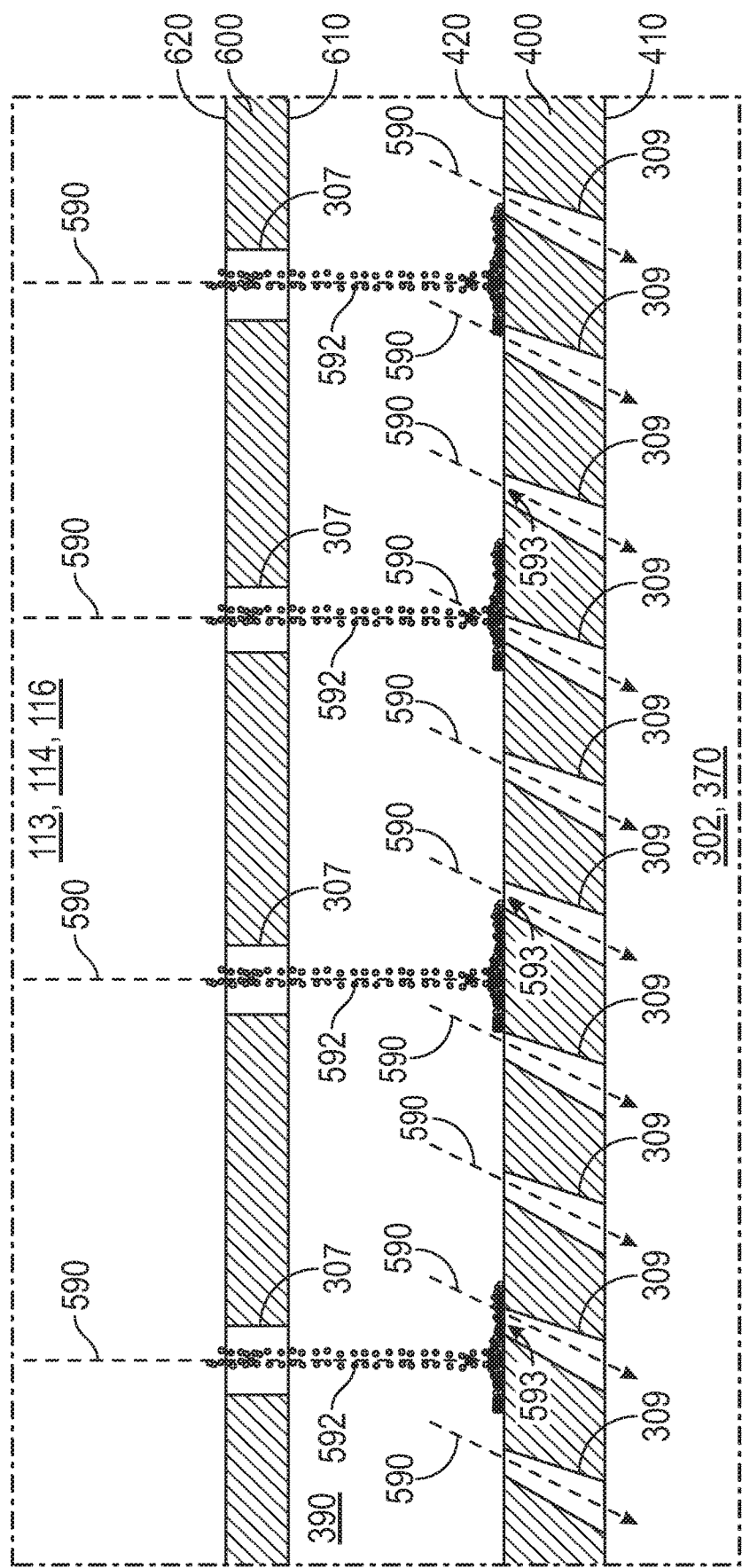
FIG. 3A is an enlarged cross-sectional illustration of a heat shield panel and combustion liner of a combustor, in accordance with an embodiment of the disclosure.

The combustor 300, as shown in FIG. 2, includes multiple heat shield panels 400 that are attached to the combustion liner 600 (See FIG. 3a). The heat shield panels may be arranged parallel to the combustion liner 600. The combustion liner 600 can define circular or annular structures with the heat shield panels 400 being mounted on a radially inward liner and a radially outward liner, as will be appreciated by those of skill in the art. The heat shield panels 400 can be removably mounted to the combustion liner 600 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the combustion liner 600 such that the heat shield panel 400 may be attached to the combustion liner 600 and held in place. The heat shield panels 400 partial enclose a combustion area 370 within the combustion chamber 302 of the combustor 300.

Figure 3B:
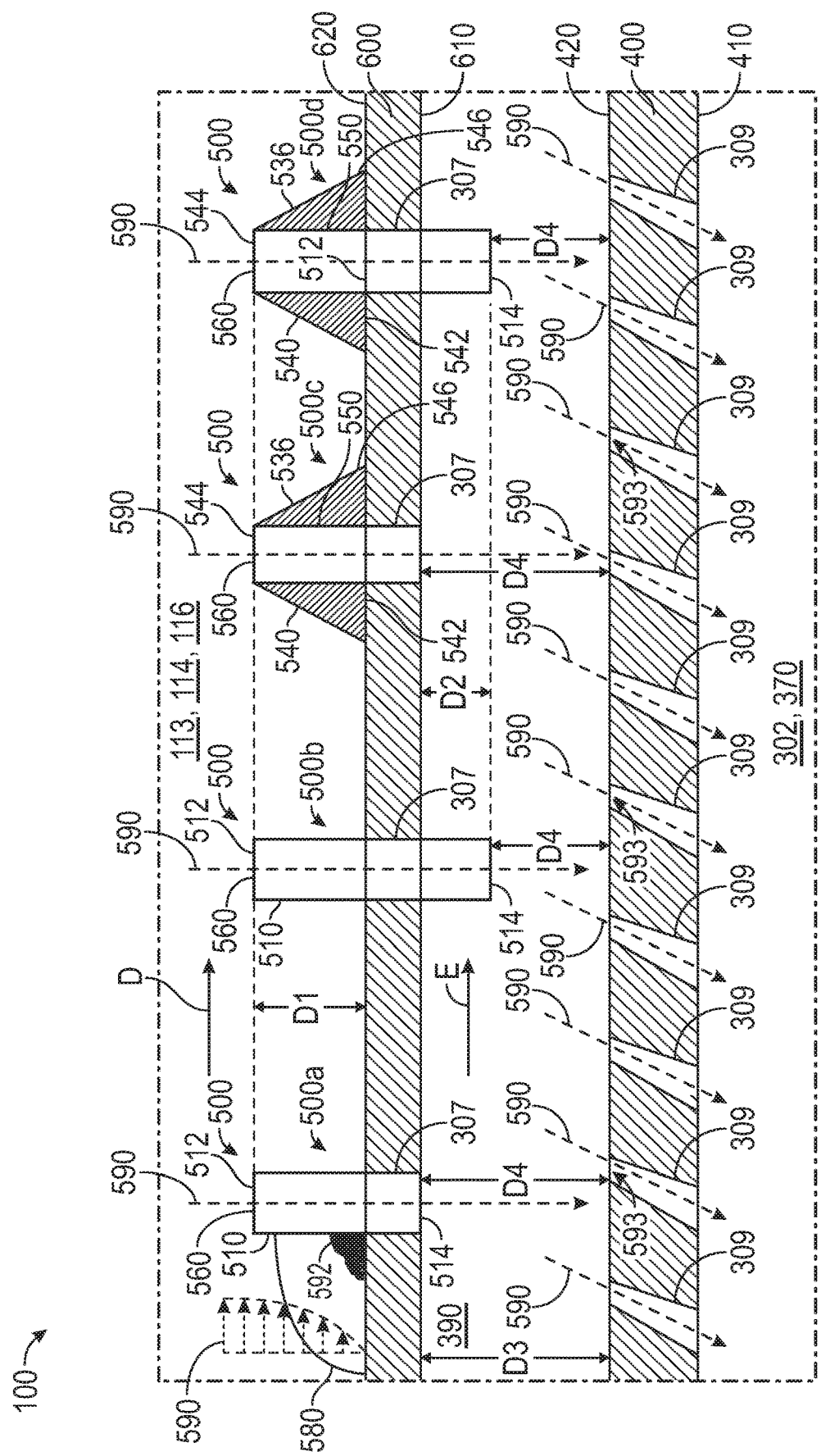
FIG. 3B is a cross-sectional illustration of a particulate mitigation system for a combustor of a gas turbine engine, in accordance with an embodiment of the disclosure.

Referring now to FIGS. 3a and 3b with continued reference to FIGS. 1 and 2. FIG. 3a illustrates a heat shield panel 400 and a combustion liner 600 of a combustor 300 (see FIG. 1) of a gas turbine engine 20 (see FIG. 1). The heat shield panel 400 and the combustion liner 600 are in a facing spaced relationship. FIG. 3b shows a particulate mitigation system 100 for a combustor 300 (see FIG. 1) of a gas turbine engine 20 (see FIG. 1), in accordance with an embodiment of the present disclosure. The heat shield panel 400 includes a first surface 410 oriented towards the combustion area 370 of the combustion chamber 302 and a second surface 420 first surface opposite the first surface 410 oriented towards the combustion liner 600. The combustion liner 600 has an inner surface 610 and an outer surface 620 opposite the inner surface 610. The inner surface 610 is oriented toward the heat shield panel 400. The outer surface 620 is oriented outward from the combustor 300 proximate the inner diameter branch 114 and the outer diameter branch 116.

The combustion liner 600 includes a plurality of primary apertures 307 configured to allow airflow 590 from the inner diameter branch 114 and the outer diameter branch 116 to enter an impingement cavity 390 in between the combustion liner 600 and the heat shield panel 400. Each of the primary apertures 307 extend from the outer surface 620 to the inner surface 610 through the combustion liner 600. Each of the primary apertures 307 fluidly connects the impingement cavity 390 to at least one of the inner diameter branch 114 and the outer diameter branch 116.

The heat shield panel 400 may include one or more secondary apertures 309 configured to allow airflow 590 from the impingement cavity 390 to the combustion area 370 of the combustion chamber 302. Each of the secondary apertures 309 extend from the second surface 420 to the first surface 410 through the heat shield panel 400. Airflow 590 flowing into the impingement cavity 390 impinges on the second surface 420 of the heat shield panel 400 and absorbs heat from the heat shield panel 400 as it impinges on the second surface 420. As seen in FIG. 3a, particulate 592 may accompany the airflow 590 flowing into the impingement cavity 390. Particulate 592 may include but are not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3a. Particulate 592 collecting upon the second surface 420 of the heat shield panel 400 reduces the cooling efficiency of airflow 590 impinging upon the second surface 420, and thus may increase local temperatures of the heat shield panel 400 and the combustion liner 600. Particulate 592 collecting upon the second surface 420 of the heat shield panel 400 may potentially create a blockage 593 to the secondary apertures 309 in the heat shield panels 400, thus reducing airflow 590 into the combustion area 370 of the combustion chamber 302. The blockage 593 may be a partial blockage or a full blockage.

Advantageously, the addition of a particulate mitigation device 500 to the combustion liner 600 may help reduce the amount of particulate 592 entering the impingement cavity 390 and collecting on the second surface 420 of the heat shield panel 400, as seen in FIG. 3b. The combustion liner 600 may include one or more particulate mitigation devices 500 and may include multiple configurations 500a-500d of the particulate mitigation device 500, as seen in FIG. 3b. The particulate mitigation device 500 is attached to the combustion liner 600. The particulate mitigation device 500 may be attached to a primary aperture 307 of the combustion liner 600. The particulate mitigation device 500 is configured to direct airflow 590 in a flow path D at a first selected distance D1 away from the outer surface 620 through one or more primary apertures 307 towards at least one of the one or more heat shield panels 400. The first selected distance D1 is located at about equal to or above the boundary layer 580 of outer surface 620. The velocity of the airflow 590 increases within increasing distance away from the outer surface 620. Due to frictional forces associated with interaction between the particulate 592 and the outer surface 620, the particles 592 tend to slow down and collect closer to the outer surface 620 within the boundary layer 580. Advantageously, by capturing airflow 590 at or above the boundary layer 580 ingestion of particulates 592 into the particulate mitigation device 500 may be reduced.

The particulate mitigation device 500 comprises a tubular body 510 fluidly connecting the flow path D to an impingement cavity 390 interposed between the combustion liner 600 and at least one of the one or more heat shield panels 400. The tubular body 510 be may fluidly connected to the impingement cavity 390 through at least one of the one or more primary apertures 307. The tubular body 510 may be located within the primary aperture 307, as seen in FIG. 3b. The tubular body 510 further comprises a first end 512 and a second end 514 opposite the first end 512. The first end 512 is located in the flow path D at the first selected distance D1 away from the outer surface 620. The tubular body 510 extends away from the outer surface 620 and into the flow path D. The first end 512 includes an opening 560 at the first selected distance D1 away from the outer surface 620. The opening 560 is fluidly connected to the impingement cavity 390 through the tubular body 510.

The second end 514 may be located in line with the inner surface 610, as seen in the first configuration 500a of the particulate mitigation device 500 in FIG. 3b. The second end 514 may be located in the impingement cavity 390 at a second selected distance D2 away from the inner surface 610, as seen in the second configuration 500b and fourth configuration 500d of the particulate mitigation device 500 in FIG. 3b. Advantageously, by locating the second end 514 in the impingement cavity 390 at a second selected distance D2, the length/diameter ratio of the tubular body 510 is increased and thus airflow impingement upon the second surface 420 is increased. Also advantageously, by locating the second end 514 in the impingement cavity 390 at a second selected distance D2, the airflow 590 is delivered closer to the second surface 420, thus resulting in increased cooling from more direct impingement. The impingement cavity 390 can be optimized to either achieve improved impingement distance D4 for impingement cooling on the second surface 420 or to better control the cross flow E in the impingement cavity 390 from the locations of inlet flow (impingement holes to flow sinks (like effusion holes). Advantageously, the second configuration 500b and the fourth configuration 500d allow designers to separately control the cross flow gap distance D3 (i.e. size of the impingement cavity) and the impingement distance D4.

The particulate mitigation device 500 may be composed of a fairing 540, as seen by the third configuration 500c and the fourth configuration 500d. The fairing 540 extends away from the outer surface 620 and into the flow path D. A second face 544 of the fairing 540 includes an opening 560 at the first selected distance D1 away from the outer surface 620. The opening 560 is fluidly connected to the impingement cavity 390 through the passageway 550 of the fairing 540. The fairing 540 includes a passageway 550 projecting into the flow path D. The fluid passageway 550 is fluidly connected to the primary orifice 307 of the combustion liner 600. The fluid passageway 550 fluidly connects the flow path D to the impingement cavity 390. The fluid passageway 550 may be formed and or drilled within the fairing 540. Advantageously, the fairing 540 helps pull airflow 590 from above the boundary layer into the tubular body 510. As seen in FIG. 3b, the fairing 540 may have a conical frustum shape. It is understood that the liner shape of the fairing 540 illustrated in FIG. 3b is non-limiting and other linear and non-linear shape may be utilized to shape the fairing 540. The fairing 540 may comprise: a first face 542 opposite the second face 544. The first face 542 may be flush with the outer surface 620, as seen in FIG. 3b. The fluid passageway 550 extends from the first face 542 to the second face 544, as seen in FIG. 3b. A first surface area of the first face 542 is greater than a second surface area of the second face 544, as seen in FIG. 3b where the first face 542 is wider than the second face 544. The fairing 540 may also include a ramp surface 546 interposed between the first face 542 and the second face 544. The fluid passage way 550 of the fairing 540 may fluidly connect to the impingement cavity 390 through a tubular body 510 as shown in configuration 500d. The first end 512 of the tubular body 510 may be located within the primary orifice 307 and/or fluidly connected to the primary orifice 307. The second end 514 of the tubular body 510 may be located in the impingement cavity 390 at the second selected distance D2 away from the inner surface D2, as seen in FIG. 3*b*.

It is understood that a combustor of a gas turbine engine is used for illustrative purposes and the embodiments disclosed herein may be applicable to additional components of other than a combustor of a gas turbine engine, such as, for example, a first component and a second component defining a cooling channel therebetween. The first component may have cooling holes similar to the primary orifices. The cooling holes may direct air through the cooling channel to impinge upon the second component.

Technical effects of embodiments of the present disclosure include capturing air for cooling a heat shield panel at locations equal to or above the boundary layer of the combustion liner to help reduce collection of particulates on the heat shield panel and also help reduce the number of particulate entering into the combustion chamber.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A shell of a combustor for a gas turbine engine, the shell comprising:
    a combustion chamber of the combustor, the combustion chamber having a combustion area;
    a combustion liner having an inner surface and an outer surface opposite the inner surface;
    a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the combustion liner by an impingement cavity; and
    a particulate mitigation device attached to the combustion liner, the particulate mitigation device extending from the outer surface of the combustion liner into a flow path, the particulate mitigation devices having an opening at a first selected distance away from the outer surface, the opening being fluidly connected with the impingement cavity, and wherein the first selected distance is greater than zero,
    wherein the particulate mitigation device further comprises a tubular body fluidly connecting the opening to the impingement cavity,
    wherein the tubular body is configured to direct airflow from the flow path through the tubular body and towards the second surface of the heat shield panel, such that the airflow exiting the tubular body impinges upon the second surface of the heat shield panel,
    wherein a particular mitigation device further comprises a fairing including a fluid passageway fluidly connecting the opening to the impingement cavity, and
    wherein the fairing has a conical frustum shape.

2. The shell of claim 1, further comprising a primary aperture extending from the outer surface to the inner surface through the liner, wherein the tubular body is fluidly connected to the impingement cavity through the primary aperture.

3. The shell of claim 1, further comprising a primary aperture extending from the outer surface to the inner surface through the liner, wherein the tubular body is located within the primary aperture.

4. The shell of claim 3, wherein the tubular body further comprises a first end and a second end opposite the first end, wherein the first end includes the opening.

5. The shell of claim 4, wherein the second end is located in the impingement cavity at a second selected distance away from the inner surface.

6. The shell of claim 4, wherein the fairing further comprises:
    a first face flush with the outer surface;
    a second face opposite the first face, wherein a first surface area of the first face is greater than a second surface area of the second face; and
    a ramp surface interposed between the first face and the second face, wherein the fluid passageway extends from the first face to the second face.

7. The shell of claim 1, wherein the heat shield panel includes a secondary aperture extending from the second surface to the first surface through the heat shield panel.

* * * * *